United States Patent [19]

Eck et al.

[11] Patent Number: 5,799,468

[45] Date of Patent: Sep. 1, 1998

[54] FILLING BLISTER-PACK STRIPS

[75] Inventors: Werner Eck; Detlev Gertitschke; Richard Mertens, all of Laupheim; Günther Bochtler, Mietingen; Reinhold Kopf, Schemmerberg; Andreas Weiss, Biberach; Rudolf Arb, Laupheim, all of Germany

[73] Assignee: Uhlmann Pac-Systeme GmbH & Co. KG, Laupheim, Germany

[21] Appl. No.: 847,847

[22] Filed: Apr. 28, 1997

[30] Foreign Application Priority Data

Apr. 27, 1996 [DE] Germany .................. 196 17 014.1

[51] Int. Cl.[6] .................................................. B65B 47/00
[52] U.S. Cl. ........................ 53/453; 53/54; 53/237; 53/240; 53/246; 53/473; 53/493; 53/494; 53/498; 53/559
[58] Field of Search .................... 53/154, 155, 53, 53/54, 237, 238, 240, 246, 453, 473, 474, 475, 493, 494, 498, 499, 500, 539, 559

[56] References Cited

U.S. PATENT DOCUMENTS

| 3,889,447 | 6/1975 | Garris | 53/53 |
|---|---|---|---|
| 4,472,922 | 9/1984 | Romagnoli | 53/53 |
| 4,722,169 | 2/1988 | DeSantis | 53/494 |
| 4,751,184 | 6/1988 | Higo et al. | 53/493 X |
| 5,005,338 | 4/1991 | Kemkers et al. | 53/494 |
| 5,033,251 | 7/1991 | Rodriguez | 53/494 X |
| 5,040,353 | 8/1991 | Evans et al. | 53/54 |
| 5,081,816 | 1/1992 | Cardinali | 53/54 |
| 5,442,892 | 8/1995 | Burns et al. | 53/495 X |
| 5,528,878 | 6/1996 | Edwards et al. | 53/495 X |
| 5,555,707 | 9/1996 | Schwenger | 53/495 X |
| 5,568,715 | 10/1996 | Ebel et al. | 53/494 X |
| 5,626,000 | 5/1997 | Edwards et al. | 53/64 X |
| 5,649,410 | 7/1997 | Martin et al. | 53/474 |
| 5,675,962 | 10/1997 | Martin et al. | 53/474 X |

*Primary Examiner*—Daniel Moon
*Attorney, Agent, or Firm*—Herbert Dubno; Andrew Wilford

[57] ABSTRACT

A blister-pack package is made by forming a strip with a plurality of fields of upwardly open pockets and filling the pockets with respective objects while leaving at least one pocket empty and then scanning the fields and determining an address of the empty pocket in the respective field. A refilling head is then loaded at a stationary location with at least one of the objects. The loaded refilling head is then positioned above the empty pocket in accordance with the determined address, and the object is dropped from the loaded and positioned head into the empty pocket.

19 Claims, 3 Drawing Sheets

5,799,468

FILLING BLISTER-PACK STRIPS

FIELD OF THE INVENTION

The present invention relates to the filling of blister-pack strips. More particularly this invention concerns a method of and apparatus for ensuring that every pocket in a blister-pack strip is filled.

BACKGROUND OF THE INVENTION

It is standard to market small items, in particular pharmaceuticals such as pills, lozenges, suppositories, or capsules, in blister packs where each pocket of the package holds a single such object. Such packages are made by forming a thermoplastic strip with a succession of fields each formed as an array of upwardly open pockets. Then a filling machine puts a single object into each pocket.

In order to ensure that each package is marketable, downstream of the filling machine another device verifies that indeed each pocket holds a respective object, for instance by actually feeling in the pockets with sensor pins or using electromagnetic radiation to detect the objects. If one or more pockets is determined to be empty the respective package is marked as a reject and culled from the production line. Alternately all the objects are vacuumed out of the pockets and the strip is recycled through the filling machine.

Such a procedure can be problematic when the product is expensive or difficult to dispose of, which is particularly the case with many pharmaceutical products. Either the object must be recuperated from the package and recycled to the filling machine, which can create sterility problems, or the entire package must be appropriately disposed of. Neither of these solutions is satisfactory.

OBJECTS OF THE INVENTION

It is therefore an object of the present invention to provide an improved system for filling blister packs.

Another object is the provision of such an improved system for filling blister packs which overcomes the above-given disadvantages, that is which ensures that each and every pocket is filled so that no packages have to be discarded.

SUMMARY OF THE INVENTION

A method of making blister-pack packages has according to the invention the steps of forming a strip with a plurality of fields of upwardly open pockets and filling the pockets with respective objects while leaving at least one pocket empty and then scanning the fields and determining an address of the empty pocket in the respective field. A refilling head is then loaded at a stationary location with at least one of the objects. The loaded refilling head is then positioned above the empty pocket in accordance with the determined address, and the object is dropped from the loaded and positioned head into the empty pocket.

Thus according to the invention the system simply finds the occasional empty pocket and fills it. The whole field does not have to be emptied and the entire strip section does not have to be discarded. Since a pocket is only left empty occasionally, the system of this invention can automatically eliminate the culls. Since it is standard to provide a system for detecting if any of the pockets is empty, it is a relatively simple method to expand this scanner to also report the address in the respective field or line. The head can be a relatively small item that can be moved rapidly to deposit the backup object in the empty pocket.

Normally according to the invention the strip is conveyed along a path through a scanning station where the address of the empty pocket is determined and then through a refilling location where the head is located. When the strip is moved continuously without stopping along the path the head is displaced synchronously with the strip while dropping the object into the empty pocket. If the strip is moved in steps along the path and stops periodically the object is dropped from the head into the empty pocket while the strip is stopped.

In accordance with the invention an address signal corresponding to the address of the empty pocket is generated and this address signal is used to position the head above the empty pocket. Furthermore it is possible according to this invention to scan the fields downstream of the head and determine if any of the pockets is still empty.

The apparatus according to the invention can be made very small so it can easily be retrofitted to, for example, an existing pill-packing machine. The small head assembly can easily be fitted downstream of the empty-pocket scanner which itself can easily be modified to report the address or location of any empty pocket in addition to the fact of its simple existence. Such an apparatus can have a line camera producing an analog output in which case the controller must include an analog/digital converter or the scanner can include a field camera.

Normally the supply includes a hopper holding a plurality of the objects, a housing forming a downwardly directed outlet opening and formed with a passage having one end at the hopper for receiving the objects therefrom and an opposite end at the outlet opening and forming a sharp acute angle therewith, and a shutter displaceable between a closed position blocking the opening and an open position freeing the opening. In addition a pair of blocking elements are spaced apart along the passage and displaceable independently of each other between positions blocking movement of objects along the passage and positions permitting such movement. Thus the supply can accurately feed the objects one at a time to the head.

The controller includes an arm carrying the head and the head is separable from the arm so that the machine can be adapted easily to differently formatted packages. Furthermore the head is formed with a throughgoing passage and is provided with a blocking piston displaceable between a blocking position across the passages and a freeing position clear of the passage. The passage has a cross section permitting a one of the objects to slide along the passage. So as to hold two of the objects, the head is provided with two such blocking pistons separated by a distance equal generally to a dimension of a one of the objects and forming a compartment capable of holding a one of the objects. In this system the head forms a pair of such compartments, one above each of the blocking pistons, each able to hold a respective one of the objects. Thus the head can load up with two of the objects and drop them one at a time.

In another arrangement according to the invention the head is formed with at least one outwardly open seat and is pivotal between a position with the seat open upward toward the supply and a position open downward toward the strip. The controller can withdraw air from the seat and suctionally adhere a one of the objects therein in the downwardly open position of the seat. Thus the head is loaded with the seat directed upward and is then inverted. When the object is over the empty pocket the suction is cut and the object drops. Once again the head can have two such seats.

To ensure that the packages are perfect, normally another scanner is provided downstream of the refilling stations. In addition the head is vertically displaceable by the control means this allows it to move up to take on an object from the supply so as to spare it a long drop, and then to move down to drop it only through a very short distance to the empty pocket.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
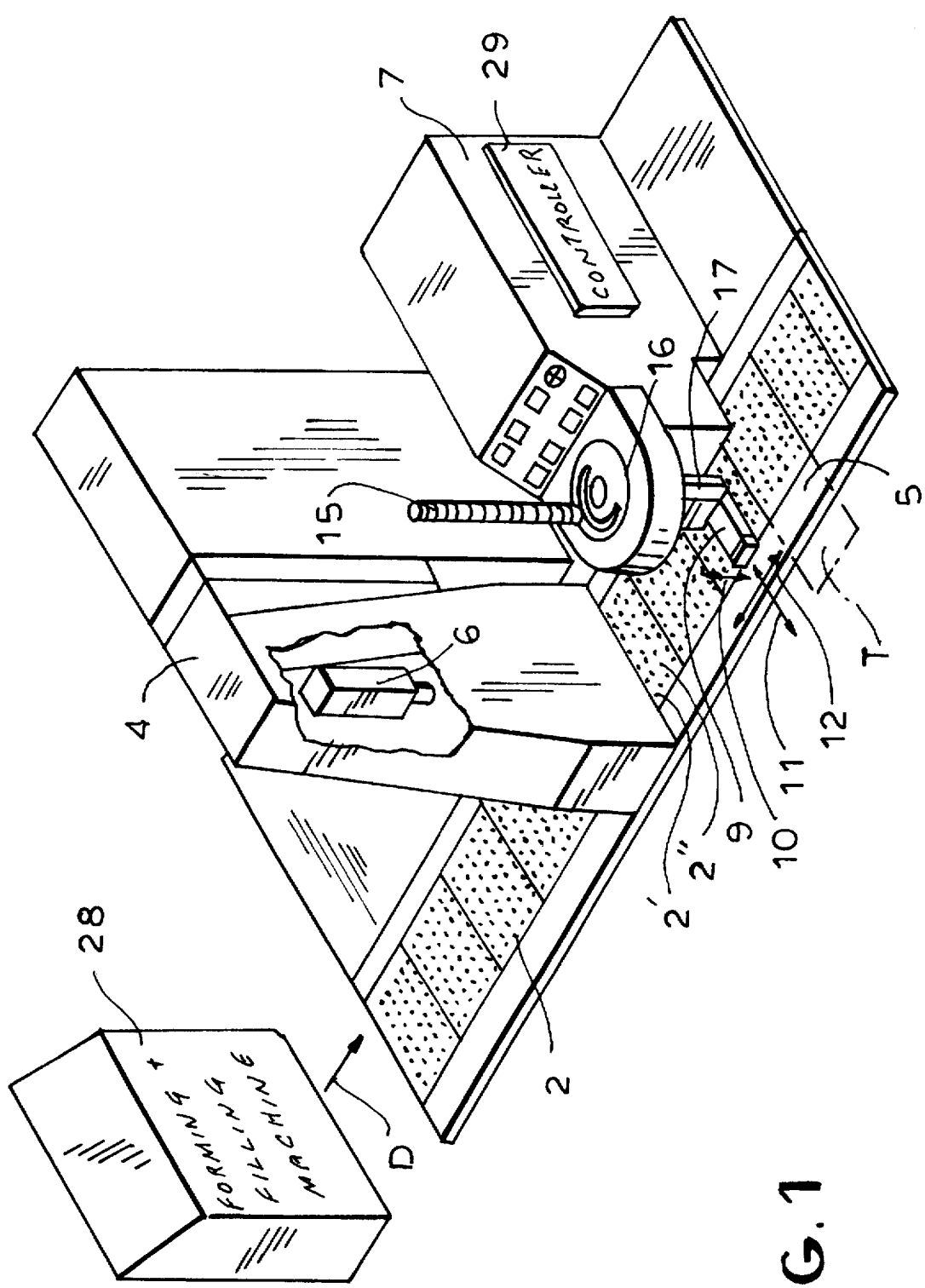
FIG. 1 is a largely diagrammatic perspective and partly sectional view of an apparatus for carrying out the method of this invention.
Figure 2:
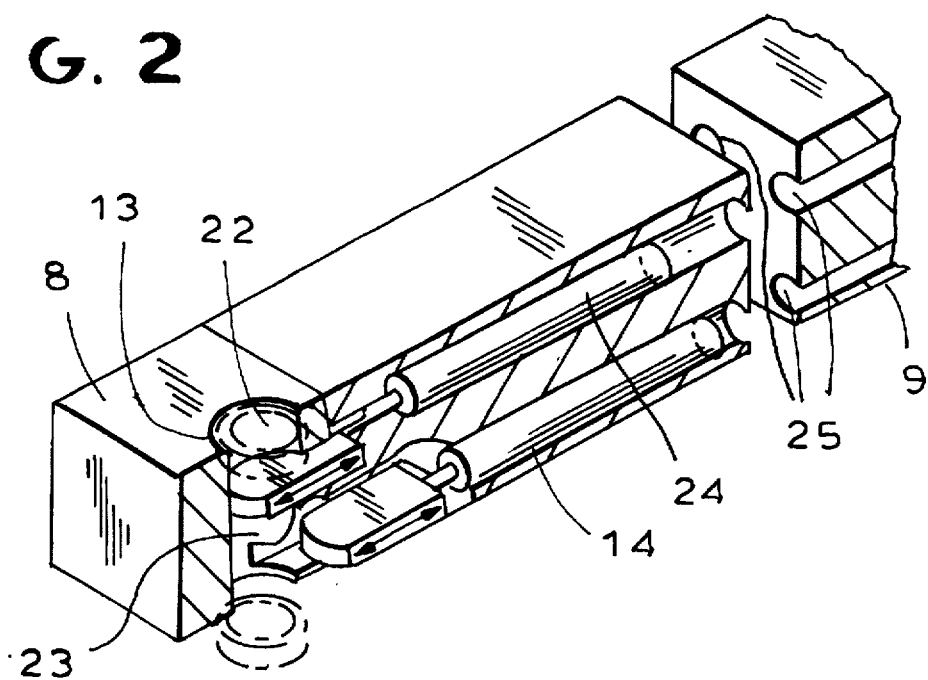
FIG. 2 is a large-scale sectional view of a detail of FIG. 1.
Figure 3:
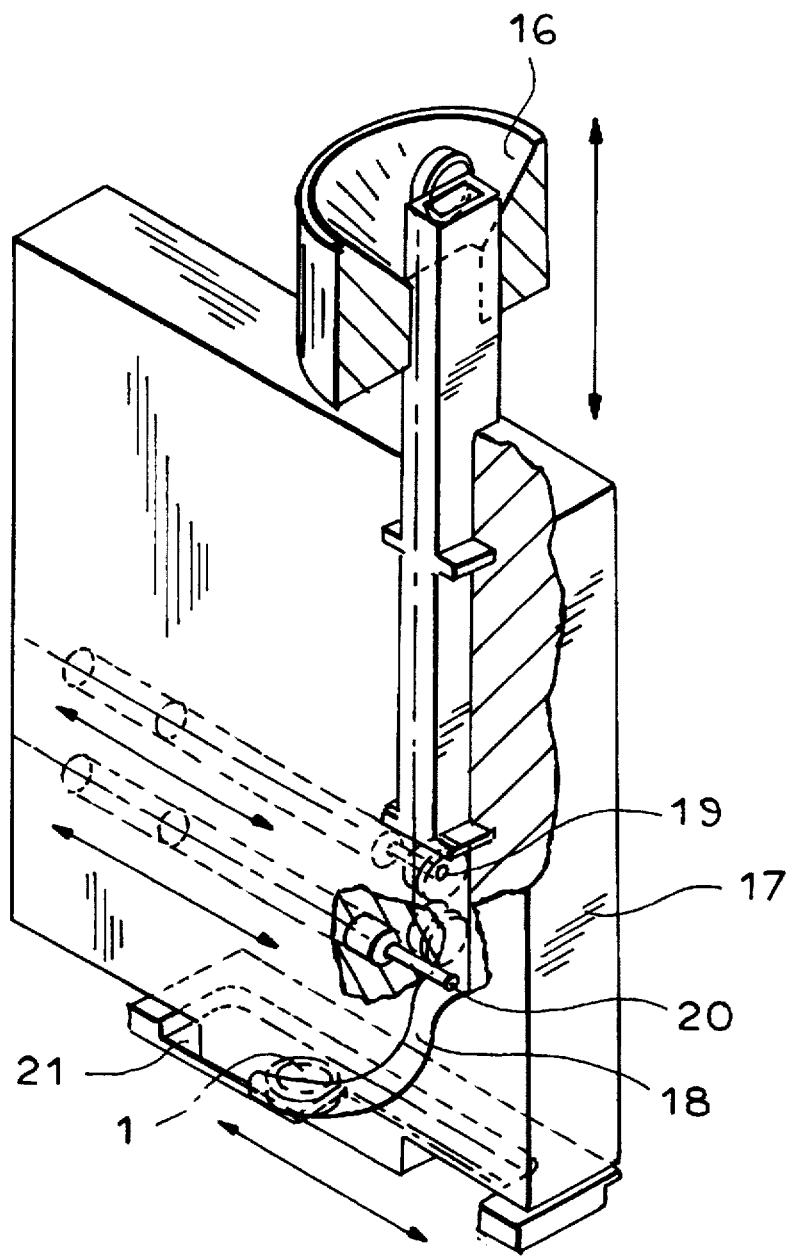
FIG. 3 is a large-scale vertical section through another detail of FIG. 1.

As seen in FIG. 1 a machine 28 of known type produces a strip 3 formed with fields of upwardly open blister pockets 2 each adapted to receive a single object 1, here a pill shown best in FIGS. 2 and 3. The strip 3 exits horizontally in a direction D from the machine 28 and passes under a scanning device 4 having a camera 6. This camera 6 can be a line camera which sequentially views each line of each field 5, or can be a field camera that views the entire field 5 and produces an output indicating the address of any empty pocket 2, such as here the empty pockets shown at 2' and 2".

The scanning device 4 digitizes the address information and feeds it to a filling device 7 having a filling head 8 carried on an outrigger arm 9 and movable vertically as shown by arrow 10, horizontally perpendicular to the direction D as shown by arrow 11, and horizontally parallel to the direction D as shown by arrow 12.

This foot 8 is formed with a cylindrical passage 13 dimensioned to pass the pills 1 and is subdivided by a pair of blocking pistons 14 and 24 operated by respective fluid lines 25 into an upper compartment 22 and a middle compartment 23. These blocking pistons 14 and 24 are in turn alternately operated by a controller 29 (FIG. 1) in the feeding device 7 as will be described below.

A supply tube 15 feeds the pills 1 to a hopper 16 atop a stationary loading shoe 17 centrally positioned over the path followed by the strip 2 downstream of the scanner 4. As shown in FIG. 3 this supply shoe 17 is formed with a passage 18 dimensioned to let one of the pills 1 pass at a time and opening at its downstream face, where the passage 18 forms a very sharp acute angle with the horizontal. A shutter 21 can be displaced back and forth over the lower end of the passage 18 between a position blocking this passage 18 and a position allowing a pill 1 in the passage 18 to drop therefrom. Two blocking pins 19 and 20 are spaced along the passage 18 by a distance equal to about the width of one of the pills 1 and are operable alternately by the controller 29 in the filling device 7 to let one pill 1 at a time pass.

The controller 29 includes actuators that displace the arm 9 such that the head 8 can move between a loading position with its passage 13 aligned below the lower end of the passage 13 and a filling position above any of the pockets 5 of the strip 1 beneath itself. The controller 29 operates the pins 19 and 20 to feed the pills 1 one at a time to the lower end of the passage 18, so that when a pill 1 is sitting atop the shutter slide 21 another pill 1 is captured between the pins 19 and 20 and a row of the pills 1 is resting atop the pin 19.

To load the foot 8 it is positioned underneath the shoe 17 with its lower blocking piston 14 advanced. Then the shutter 21 is opened to drop the pill 1 in the bottom of the passage 18 into the top of the passage 13, so that this pill 1 comes to rest atop the piston 14 in the lower compartment 22.

Immediately thereafter the controller 29 simultaneously moves the pin 20 back and the blocking piston 24 forward so that another pill 1 is delivered from the lower end of the passage 18 to the passage 13 where it comes to rest atop the piston 24 in the compartment 22.

Then the foot 8 is moved into position above the first empty pocket 2' and the piston 14 is retracted to dump the pill 1 in the compartment 22 into this pocket 2'. The foot 8 is then moved into position above the second empty pocket 2" and the piston 24 is retracted to dump the pill 1 in the compartment 23 into this pocket 2". Meanwhile the shutter 21 is moved back to the blocking position and the pin 20 is advanced, then the pin 19 is retracted to let one pill 1 pass and the pin 20 is advanced again to let this pill 1 drop down to sit atop the shutter 21. Then the pins 19 and 20 are alternately advanced and retracted to capture another pill 1 between the pins 19 and 20 and return the device to the starting position.

If the strip 3 moves continuously the head 8 is moved along synchronously with it as it fills the empty pockets 2' and 2". If the strip 3 is moved in steps the filling can take place as it moves and/or while it is stopped.

Figure 2A:
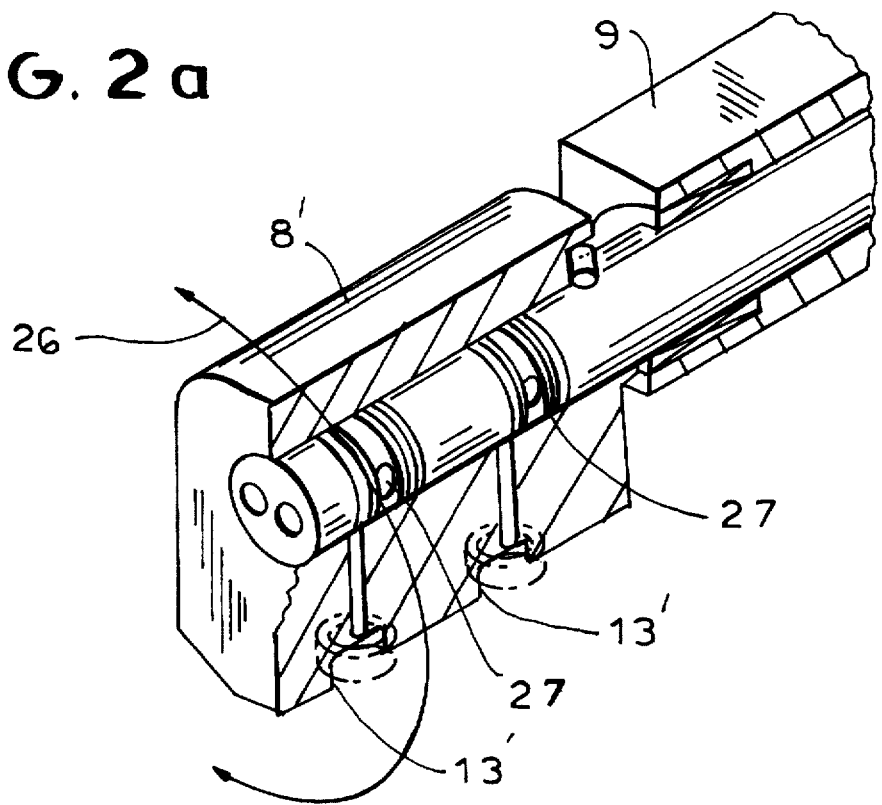
FIG. 2a is a view like FIG. 2 but of an alternative arrangement according to the invention.

FIG. 2a shows another head 8' that is rotatable as indicated by arrow 26 about a horizontal axis and that has two seats 13' that are each subjected to a subatmospheric pressure by a respective vacuum line 27. When turned upward the seats 13' can be filled by the filling shoe 17 as described above, and when inverted with the seats 13' opening downward the suction will hold the pills 1 in place. The suction to the two pockets 13' is individually controlled so as to allow the pills 1 in the pockets 13' to be dropped one at a time.

We claim:

1. A method of making blister-pack packages, the method comprising the steps of:

forming a strip with a plurality of fields of upwardly open pockets and filling the pockets with respective objects while leaving at least one pocket empty;

scanning the fields and determining an address of the empty pocket in the respective field;

loading into a refilling head at a stationary location at least one of the objects;

positioning the loaded refilling head above the empty pocket in accordance with the determined address; and dropping the object from the loaded and positioned head into the empty pocket.

2. The blister-pack making method defined in claim 1, further comprising the step of conveying the strip along a path through a scanning station where the address of the empty pocket is determined and then through a refilling location where the head is located.

3. The blister-pack making method defined in claim 2, further comprising the steps of generating an address signal corresponding to the address of the empty pocket; and using the address signal to position the head above the empty pocket.

4. The blister-pack making method defined in claim 2 wherein the strip is moved continuously without stopping along the path, the method further comprising the step of displacing the head synchronously with the strip while dropping the object into the empty pocket.

5. The blister-pack making method defined in claim 2 wherein the strip is moved in steps along the path and stops periodically, the object being dropped from the head into the empty pocket while the strip is stopped.

6. The blister-pack making method defined in claim 2, further comprising the step prior to displacing the head into position above the empty pocket of displacing the head to the stationary supply location.

7. The blister-pack making method defined in claim 2, further comprising the step of scanning the fields downstream of the head and determining if any of the pockets is still empty.

8. An apparatus for making blister-pack packages, the apparatus comprising:

means for forming a strip with a plurality of fields of upwardly open pockets, for filling the pockets with respective objects while leaving at least one pocket empty, and for displacing the strip along a path through a scanning and a refilling station;

means at the scanning station for scanning the fields and determining an address of the empty pocket in the respective field;

a supply of the objects at the refilling station;

a refilling head displaceable between the supply and a position above the strip;

means at the supply for loading at least one of the objects into the head; and control means at the refilling station for displacing the loaded head away from the supply and into position above the empty pocket in accordance with the determined address and for dropping an object from the head into the empty pocket.

9. The blister-pack making apparatus defined in claim 8 wherein the scanning means includes a line camera producing an analog output, the control means including an analog/digital converter.

10. The blister-pack making apparatus defined in claim 8 wherein the scanning means includes a field camera.

11. The blister-pack making apparatus defined in claim 8 wherein the supply includes a hopper holding a plurality of the objects;

a housing forming a downwardly directed outlet opening and formed with a passage having one end at the hopper for receiving the objects therefrom and an opposite end at the outlet opening and forming a sharp acute angle therewith; and a shutter displaceable between a closed position blocking the opening and an open position freeing the opening.

12. The blister-pack making apparatus defined in claim 11 wherein the supply further includes a pair of blocking elements spaced apart along the passage and displaceable independently of each other between positions blocking movement of objects along the passage and positions permitting such movement.

13. The blister-pack making apparatus defined in claim 8 wherein the control means includes an arm carrying the head and the head is separable from the arm.

14. The blister-pack making apparatus defined in claim 8 wherein the head is formed with a throughgoing passage and is provided with a blocking piston displaceable between a blocking position across the passages and a freeing position clear of the passage, the passage having a cross section permitting a one of the objects to slide along the passage.

15. The blister-pack making apparatus defined in claim 14 wherein the head is provided with two such blocking pistons separated by a distance equal generally to a dimension of a one of the objects and forming a compartment capable of holding a one of the objects.

16. The blister-pack making apparatus defined in claim 15 wherein the head forms a pair of such compartments, one above each of the blocking pistons, each able to hold a respective one of the objects.

17. The blister-pack making apparatus defined in claim 8 wherein the head is formed with at least one outwardly open seat, the head being pivotal between a position with the seat open upward toward the supply and a position open downward toward the strip, the control means including means for withdrawing air from the seat and sectionally adhering a one of the objects therein in the downwardly open position of the seat.

18. The blister-pack making apparatus defined in claim 17 wherein the head is formed with two seats.

19. The blister-pack making apparatus defined in claim 8 wherein the head is vertically displaceable by the control means.

* * * * *